Sept. 1, 1959 W. O. SPRANG 2,902,060
CUTTING AND TWISTING DEVICE FOR COILED WIRE
Filed July 19, 1954 3 Sheets-Sheet 1
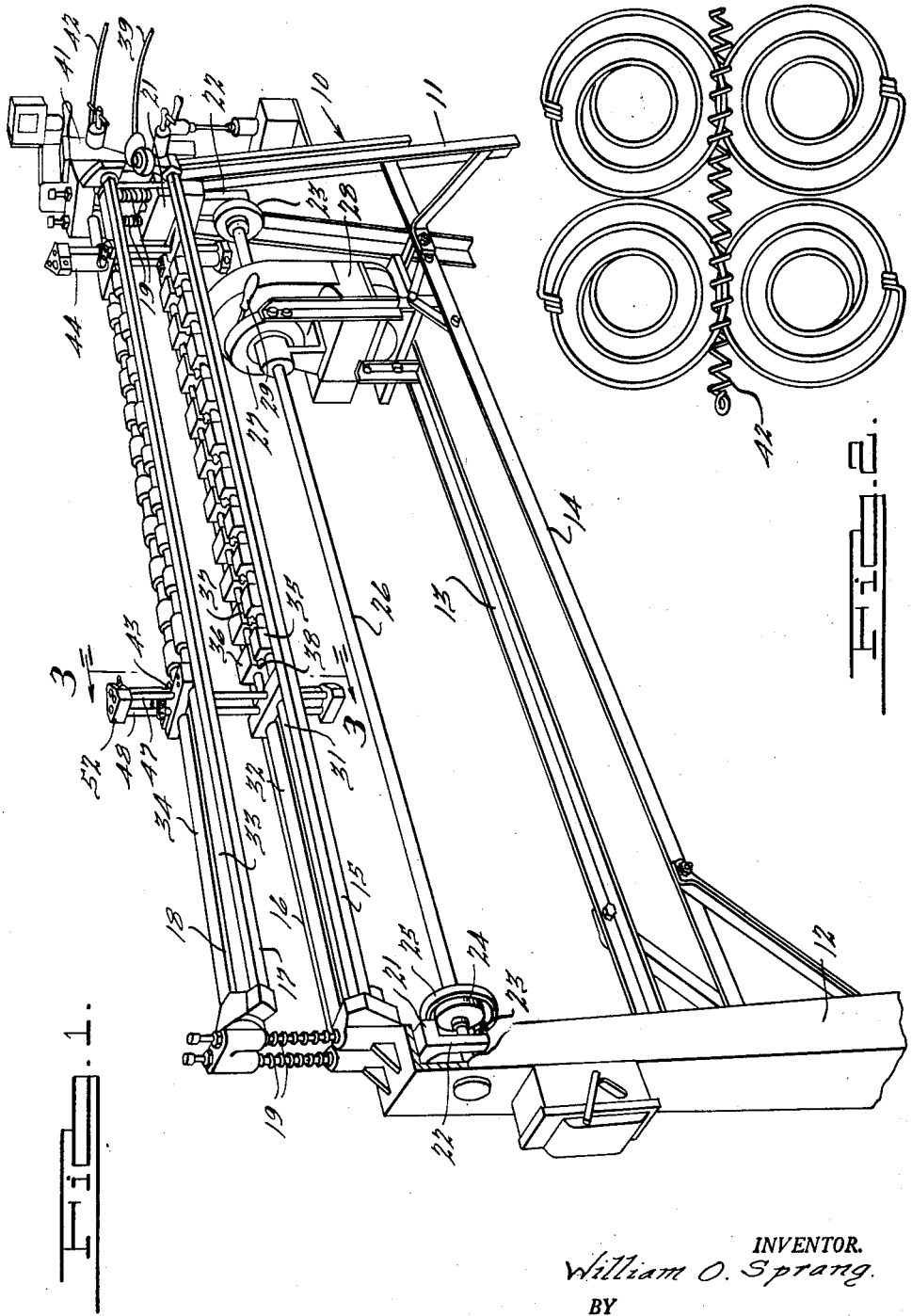
INVENTOR.
William O. Sprang.
BY
Harness, Dickey & Pierce
ATTORNEYS.

Sept. 1, 1959    W. O. SPRANG    2,902,060
CUTTING AND TWISTING DEVICE FOR COILED WIRE
Filed July 19, 1954    3 Sheets-Sheet 2

INVENTOR.
William O. Sprang.
BY
Harness, Dickey & Pierce
ATTORNEYS

Sept. 1, 1959 W. O. SPRANG 2,902,060
CUTTING AND TWISTING DEVICE FOR COILED WIRE
Filed July 19, 1954 3 Sheets-Sheet 3

INVENTOR.
William O. Sprang
BY
Harness, Dickey & Pierce
ATTORNEYS

United States Patent Office 2,902,060
Patented Sept. 1, 1959

2,902,060

CUTTING AND TWISTING DEVICE FOR COILED WIRE

William O. Sprang, Detroit, Mich., assignor to No-Sag Spring Company, Warren Township, Macomb County, Mich., a corporation of Michigan Application July 19, 1954, Serial No. 443,994

7 Claims. (Cl. 140—92.3)

This invention relates to wire forming machines, and particularly to a machine which severs a coiled wire and bends the end thereof.

Long lengths of coiled wire, known in the trade as pigtails, are employed for coiling about the endmost adjacent turns of rows of springs to be employed in mattresses, seat cushions and the like. The pigtails retain the top and bottom coils of the assembly in unit relation to each other, permitting the springs to be compressed when loaded, with the top coil assuming various deflected positions.

The present invention pertains to the severing of the ends of the length of pigtail after it has joined the end coils of two adjacent rows of springs and the bending of the severed ends in a manner to prevent the pigtail from moving lengthwise relative to the assembled springs.

A machine is employed having holding elements in which the springs are assembled in aligned relation in rows, with the adjacent top and bottom coils retained in adjacent abutted relation to each other. The pigtail is guided through the holding elements as it is spun about its axis to wind about the abutted portions of adjacent coils the full length of the rows. The present invention pertains to severing and twisting devices applied to both ends of the machine which sever both ends of the coiled wire and twist the ends thereof so as to prevent the pigtail from shifting lengthwise and release the adjacent end turns of the rows of springs.

Accordingly, the main objects of the invention are: to provide a machine for cutting the ends of pigtails after joining the top and bottom turns of a row of coil springs, and bending the ends into a loop; to provide attaching means at each end of the spring assembling machine which operate in unison when one portion thereof is moved relative to the other portion for cutting the ends of pigtails and for twisting the ends to prevent the pigtail from shifting; to provide devices at each end of a coil assembly machine which have twisting and severing heads at the top and bottom for operating on the top and bottom pigtail which are wound about the end turns of rows of coil springs which first sever the pigtails and bend the ends into a loop, and, in general, to provide a spring machine with cutting and severing means for a pigtail which is simple in construction, positive in operation, and economical of manufacture.

Other objects and features of novelty of the invention will be specifically pointed out or will become apparent when referring, for a better understanding of the invention, to the following description taken in conjunction with the accompanying drawings, wherein:

Figure 1 is a perspective view of a spring assembling machine having cutting and bending means for pigtails thereon, embodying features of the present invention;

Fig. 2 is a broken plan view of the adjacent bottom turns of the assembled rows of coil springs joined in unit relation to each other, as practiced by the present invention;

Figure 3:
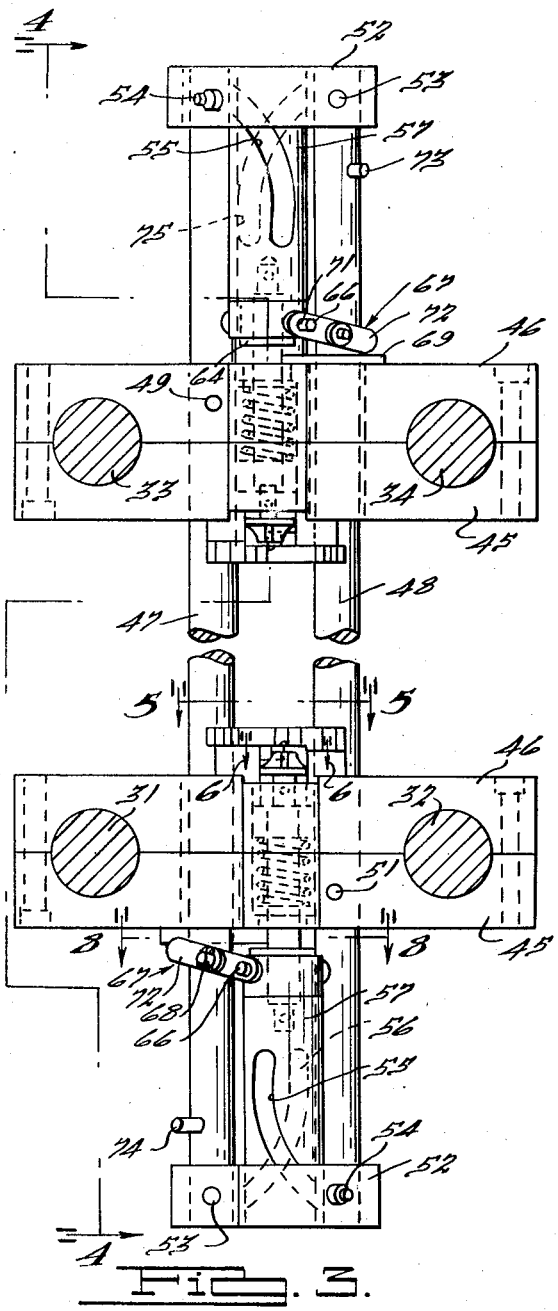
Fig. 3 is an enlarged, broken sectional view of the structure illustrated in Fig. 1, taken on the line 2—2 thereof.

Referring to Fig. 1, a machine 10 is illustrated in which coil springs to be assembled are nested. A pair of standards 11 and 12 are braced at the bottom by angle members 13 and 14 and support a pair of bars 15 and 16 at the top. A second pair of bars 17 and 18 are mounted thereabove on a pair of rods 19 at each end of the machine which are secured to a head 21 on a vertically movable slide 22 which carries a roller 23 disposed in a cam slot 24 in a cam member 25. The cam member 25 at each end of the machine is secured to a rotatable shaft 26 driven through a clutch 27 from suitable driving mechanism 28. An operating handle 29 controls the operation of the clutch for engaging and disengaging the shaft 26.

A pair of rods 31 and 32 are mounted between the supporting rods 15 and 16 at the top of the machine, and a pair of similar rods 33 and 34 are mounted between the rods 17 and 18 on the supporting rods 19. Upon the rods 31 and 32 and the rods 33 and 34, sets of clamping heads 35 and 36 are secured, those on the rods 33 and 34 facing downwardly, those on the rods 31 and 32 facing upwardly. A row of coil springs is placed on the heads 36, while a second row is placed on the heads 35, with the top and bottom turns abutting each other within slots 37 between the heads. Semicircular notches are cut in the faces of the heads forming cylindrical apertures 38 which are in aligned relation and through which a pigtail or a length of a coil of wire 39 is spun to wind about the adjacent portions of each of the turns, to thereby retain the turns in locked, pivoted relation to each other at the top and bottom of the rows of coil springs.

A mechanism 41 may be provided on the end of the machine to which wires 42 are fed, coiled and spun through the aperture 38 in the top and bottom sets of heads, eliminating the separate operation of forming the coil in a second machine. The above mechanism is of standard construction except for the use of the positive cam 25 operating in conjunction with the roller 23 to move the heads 21 downwardly and also the upper rods 17 and 18, 33 and 34 downwardly. Heretofore, as one row of springs was applied to another until a spring cushion or mattress assembly was constructed, it was necessary to cut both ends of the pigtail coil and bend the ends into a loop to prevent the pigtail from shifting lengthwise which would disconnect the endmost turns from each other.

The present invention pertains to a mechanism for automatically cutting the ends of the coil and bending a loop thereon. Like mechanisms 43 and 44 are mounted on the rods 31 and 32, 33 and 34 at each end of the machine. Since both of these mechanisms are the same except for one facing to the left and the other facing to the right, a single mechanism 43 will be described. The structure illustrated in Fig. 3 is a section of the machine illustrated in Fig. 1 facing to the left, showing the rods 31 and 32, 33 and 34. Clamping plates 45 and 46 are secured about the rods 31 and 32, 33 and 34, and a pair of rods 47 and 48 are extended through the plates. The rod 47 is secured to the upper plate 46 of the plates secured to the upper rods 33 and 34 by a pin 49. The rod 48 is secured to the plate 45 secured to the bottom rods 31 and 32 by a pin 51. The rod 47 slides through the plates 45 and 46 of the lower rods 31 and 32, while the rod 48 has the plates 45 and 46 on the upper rods 33 and 34 move thereover. Thus, when the heads 21 are moved downwardly when the shaft 26 is rotated a half revolution, the rod 47 is carried downwardly with the rods 33 and 34, while the rod 48 is maintained stationary. The rod 47 has a block 52 secured thereon by a pin 53, the block having an aperture through which a pin 54 extends when projecting through an arcuate slot 55 in a rotatable head 57 disposed in said aperture. The block also has an aperture through which the rod 48 extends. A block 52 is secured to the upper ends of the rod 48 by a pin 53. A pin 54 extends through an aperture in the block 52 which projects through an arcuate slot 55 in a rotatable head 57 disposed in said aperture. The block 52 secured to the rod 48 also has an aperture through which the rod 47 extends. The plates 45 and 46 have the rotatable heads 57 secured thereto. During the downward movement of the rods 33 and 34, the rotatable head 57 on the plates 45 and 46 is carried downwardly therewith, while the rotatable head 57 on the plates 45 and 46 on the rods 31 and 32 is retained against bodily movement by the plates. In both arrangements, there is a relative movement between the rotatable head and its associated pin 54. Relative to the upper rods 33 and 34, the head moves downwardly over the pin 54 which is secured to the stationary block 52. Relative to the lower fixed rods 31 and 32, the pin 54 is carried downwardly by the block 52 on the rod 47 relative to the head 57. In Figs. 1 and 3, the mechanism is shown with the rods 33 and 34 at the end of their downward travel after the ends of the coil are severed and the loops formed thereon.

The head 57 has a stud 58 secured in a threaded aperture 59, retained against relative turning movement by a key portion 61 on the stud 58 extending into a slot in the head 57, with the threaded portion locked by a screw 62. A sleeve 63 is mounted about the stud 58 above a thrust ball bearing 64. A sleeve 65 is disposed about the sleeve 63 and thrust bearing 64, having a pair of pins 66 diametrically disposed on opposite sides of the sleeve 65. A pair of links 67 is secured over the pins 66 and is fulcrumed on a pin 68 extending through a block 69 mounted on the plates 45 on the rods 31 and 32 and the plate 46 on the rods 33 and 34. The links have a slot 71 which receives the pins 66. The opposite ends 72 of the links are in a position to engage a pin 73 on the rod 48 and a pin 74 on the rod 47 respectively. Upon the return movement of the rods 33 and 34, the ends 72 of the links 67 will strike the pin 73 as the head 57 is carried upwardly by the rods 33 and 34, assisting the head to return to its starting position. As the rod 47 is carried upwardly with the rods 33 and 34, the pin 74 moves upwardly therewith to engage the ends 72 of the links 67 on the bottom head 57 to cause it to return to its starting position. During the upward movement of the rod 47, the heads 57 rotate backwardly substantially 90° to their initial positions, after which, near the end of the upward travel during the time the pins 54 are in the straight portions 75 of the slots 55, no further rotating movement occurs. Upon the initial downward movement of the rods 33 and 34, the straight portions 75 will be traveling past the ends of the pins 54 and no rotating movement will occur to the heads 57. During this downward movement, the cutting and looping elements, hereinafter to be described, are moved into operating relationship with each other and the ends of the coil to be operated upon. The further downward movement of the rods 33 and 34 will produce a turning movement to the heads 57 due to the relative movement between the slots 55 thereof and the pins 54 projecting therethrough. A substantially 90° movement in rotation of both twisting heads 57 occurs on said downward movement of the rods 33 and 34.

The stud 58 has a head 76 disposed within an aperture 77 in the plates 45 and 46. A spring 78 within the aperture urges the stud downwardly, having one end engaging the head 76 and the other end engaging a headed bushing 79. A bracket 81 is secured to the plate 45 attached to the rods 33 and 34, and a like bracket 81 is attached to the plate 46 secured to the rods 31 and 32. The bracket 81 has a slot 82 for receiving a cutting tool 83 which is secured in fixed relation to the slot by a screw 84. The cutting end 85 is mounted in position to sever the wire upon the rotation of the head 57 and a similar cutting edge 85 is provided on the opposite end so that the cutter may be reversed when one of the ends becomes dull.

Figure 5:
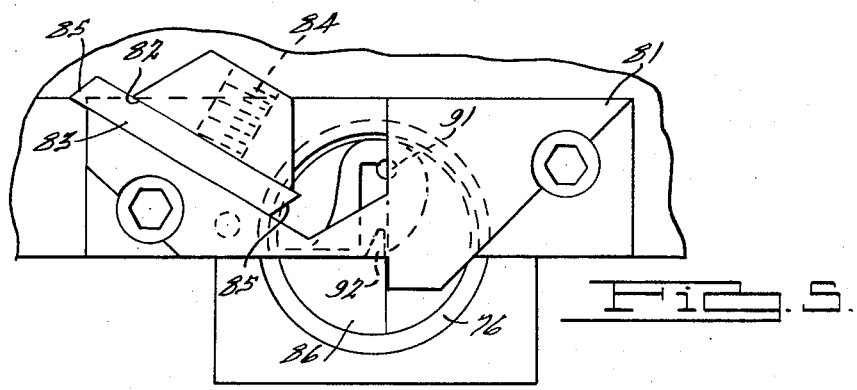
Fig. 5 is an enlarged, sectional view of the structure illustrated in Fig. 3, taken on the line 5—5 thereof.
Figure 7:
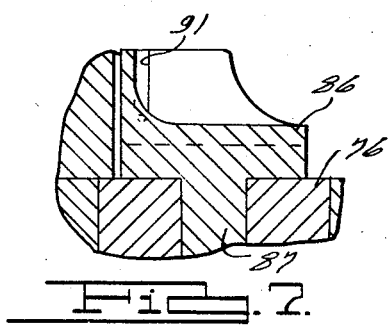
Fig. 7 is a broken sectional view of the structure illustrated in Fig. 6, taken on the line 7—7 thereof.
Figure 6:
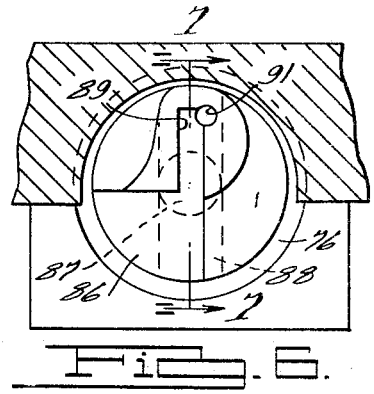
Fig. 6 is an enlarged, broken sectional view of the structure illustrated in Fig. 2, taken on the line 6—6 thereof.

A twisting head 86 is secured by a stud 87 to the end of the stud 58, having a flange 88 extending in a slot in the head 76 to prevent relative rotation therebetween. The twisting head has a slot 89 therein in which one turn of the pigtail engages when the head is initially moved downwardly within the bracket 81. During the further downward movement of the rods 33 and 34, the head is turned substantially 90° counterclockwise from the position illustrated in Figs. 5 and 6 so that the radial wall portion 91 will pass directly across the face of the cutting edge 85 and the wire of the pigtail disposed between the head and blade will be severed upon the initial rotation of the head clockwise. The further rotation of the head will twist the severed end to form a loop thereon. A slot 92 is formed in the plate 81 adjacent to the point where the head passes thereover so that the loop portion of the coil will be retained thereby as the head turns to twist a loop on the half loop of the pigtail retained within the slot 89.

Figure 4:
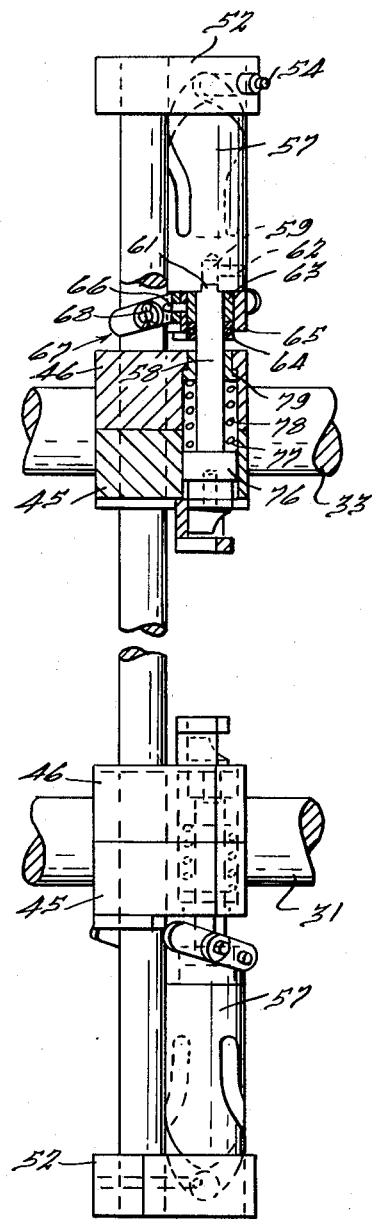
Fig. 4 is a sectional view of the structure illustrated in Fig. 3, taken on the line 4—4 thereof.

When the rods 33 and 34 have reached their downmost position, as illustrated in Figs. 3 and 4, the cam plate 25 immediately reverses the movement and returns the rods 33 and 34 to their uppermost position. When this occurs, the rod 47 moves upwardly therewith, carrying the block 52 upwardly therewith to cause the rotatable head 57 supported on the plates 45 and 46 attached to the fixed rods 31 and 32 to turn to the right, as viewed in the figure, returning the head 86 to its original position. Similarly, the block 52 fixed on the stationary rod 48 will cause the rotatable head 57 carried by the plates 45 and 46 attached to the rods 33 and 34, which move upwardly therewith, to rotate to the left, as viewed in the figure, returning the head 86 to its initial position. Near the end of the upward movement, the ends of the levers 72 strike the pins 73 on the rods 48 or are struck by the pins 74 on the movable rod 47 to make certain that both the heads 57 are returned to their fully retracted positions before the next operation is begun.

Figure 8:
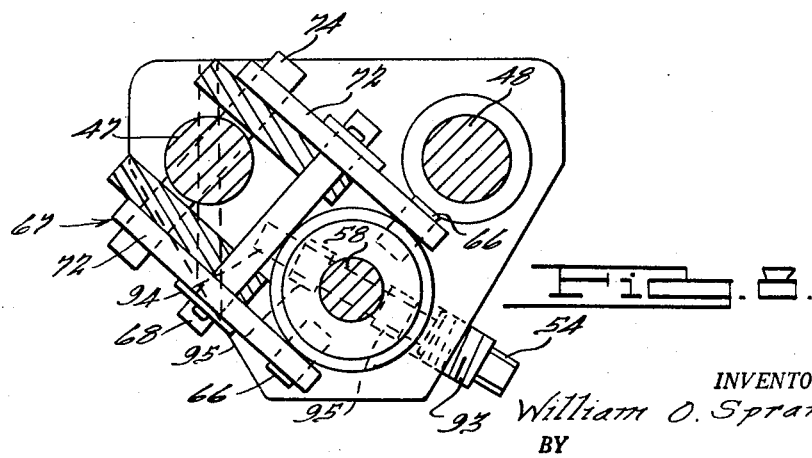
Fig. 8 is an enlarged sectional view of the structure illustrated in Fig. 3, taken on the line 8—8 thereof.

As illustrated in Fig. 8, the pin 54 has a threaded portion 93 by which it is secured to the head 52 in the threaded aperture therein, having a body portion 94 which extends through the slot 55 through rotatable head 57. A pair of rollers 95 is mounted on the pin 54 which engages one side wall of the slot when the head is moved over the pin or the pin moved relative to the head. After the rods 33 and 34 have returned to their initial position, the connected row of coil springs is moved backwardly to have the last applied row rest upon the heads 36 so that a new row of the coil springs may be placed upon the heads 35. The pigtail forming heads 41 are then operated to form the two pigtails which are wound through the upper and lower adjacent turns of the coil springs assembled in the heads 35 and 36 on the rods 31 and 32 at the bottom and rods 33 and 34 at the top. When the end portions of the pigtails have passed through the endmost brackets 81, a micro switch stops the operation of the coil winding mechanism 41 and the clutch 27 is then connected by the operation of the handle 29 to rotate the shaft 26 a complete turn, the first half of which produces the downward movement of the rods 33 and 34, causing the twisting heads 86 to move into the brackets 81 to engage a turn of the pigtail which is immediately severed when the twisting heads 86 at the top and bottom and at both ends of the machine are simultaneously rotated through the rotation of the twisting heads 57. As the heads 86 rotate, the wire of the pigtail is severed and the remaining portion of the loop within the slot 89 is twisted relative to the length of the pigtail so that the ends are locked in position with relation to the turns of the rows of springs which are held together thereby, preventing the pigtails from rotating and becoming disengaged therefrom. During the latter half of the rotation of the shaft 26, the rods 33 and 34 are returned to their uppermost position, thereby reversing the rotation of the heads 57 and the twisters 86. The complete return movement of the heads 57 is assured by the engagement of the ends 72 of the links 69 with the pins 73 and 74 near the end of the upward movement of the rods 33 and 34.

What is claimed is:

1. A severing and cutting mechanism for a pigtail, embodying a rotatable head having a slot therein, a pin within the slot, a fixed plate having a cutter therein through which the pigtail is advanced, a twisting head on the end of said slotted head which advances over the pigtail to have a portion thereof locked between the twister head and cutter, the further rotative movement produced to the slotted head by the pin causing said twister head to rotate to sever the wire of the pigtail and to twist the end thereof, and means movable toward and away from each other for advancing and retracting said twisting head and linearly moving said pin to rotate said rotatable head.

2. A severing and cutting mechanism for a pigtail, embodying a rotatable head having a slot therein, a roller within the slot, a fixed plate having a cutter therein through which the pigtail is advanced, a twisting head on the end of said slotted head which advances over the pigtail to have a portion thereof locked between the twister head and cutter, the further rotative movement produced to the slotted head by the roller causing said twister head to rotate to sever the wire of the pigtail and to twist the end thereof, a pivoted link mounted on said slotted head, a pin engageable with one end of the link near the end of the retractive movement of the slotted head for returning the twister head to its initial position, and means movable toward and away from each other for advancing and retracting said twisting head and linearly moving the pin within the slot to rotate said rotatable head.

3. In a machine for assembling rows of springs and securing the top and bottom terminal turns together by a pigtail which is spun thereabout, a cutting and twisting mechanism at each end of the machine, embodying supporting bars attachable to said machine, a pair of rods passing through the bars, the upper bars being movable downwardly toward and from the lower bars, one of said rods being fixed to the top bar to move downwardly therewith, the other of said rods being fixed to the bottom bar over which the top bar moves, a head fixed to the stationary bar at the top thereof, a similar head fixed to the movable bar at the bottom thereof, a rotatable head supported by said plates having a slot therein, a roller carried by said heads on the ends of the rods engageable with said slot, said plates having a cutter thereon adjacent to an opening through which the pigtail advances, a twister head on the end of the rotatable heads, and means for moving said upper bars downwardly to cause said rotatable heads to rotate after the twister head has been advanced to have a slot therein engage a turn of the pigtail adjacent to the cutter so that the pigtail is immediately severed when the twister head is rotated to twist a loop on the ends of the pigtail to lock them against endwise movement relative to the turns of the springs over which it was spun.

4. In a machine for securing the upper and lower turns of rows of coil springs by pigtails, said machine having a pair of standards, parallel bars extending between said standards, spring supporting heads on said bars on which the coils are assembled with the end turns in adjacent relation to each other about an aperture through which the pigtail is spun, a pair of bars spaced from said first bars and secured to a downwardly movable head at each end of the machine, cam means at each end of the machine for positively moving the heads downwardly and upwardly to their initial positions, blocks supported on said fixed and said movable bars at both ends of the group of heads mounted therebetween, a cutter supported by each of said blocks, a rotatable head on each of said blocks, a twister supported on each of said heads for longitudinal and rotational movement relative to the cutters, and means carried by said blocks and actuated when the movable bars are moved downwardly by said heads for advancing the twisters adjacent to the cutters, engaging a turn of the pigtail and for twisting the heads to sever the pigtails and twist the ends thereof into loops.

5. In a machine for securing the upper and lower turns of rows of coil springs by pigtails, said machine having a pair of standards, parallel bars extending between said standards, spring supporting heads on said bars on which the coils are assembled with the end turns in adjacent relation to each other about an aperture through which the pigtail is spun, a pair of bars spaced from said first bars and secured to a downwardly movable head at each end of the machine, cam means at each end of the machine for positively moving the heads downwardly and upwardly to their initial positions, blocks supported on said fixed and said movable bars at both ends of the group of heads mounted therebetween, a cutter supported by each of said blocks, a rotatable head on each of said blocks, a twister supported on each of said heads for longitudinal and rotational movement relative to the cutters, a pair of rods extending through the bars at the ends of the machine, one rod being fixed to the block on the movable bars, the other rod being fixed to the block on the fixed bars, a head on each of the rods extending therethrough, and a roller carried by each said head engageable with a slot in said rotatable heads, said twisters being moved into adjacent position to said cutter after the pigtail has been advanced thereto upon the initial downward movement of the movable bars, the further movement thereof causing said rotatable heads to rotate the twisters to sever the wire of the pigtails at both ends thereof and twist a loop on the severed end.

6. In a severing and cutting mechanism for coiled wires which connect the top and bottom turns of coil springs in pivotal relation to each other, said machine having a support for the rows of springs to be connected together, a support thereabove movable toward the fixed support, a pair of rods one fixed to the fixed support the other fixed to the movable support, a head on each rod carrying a pin, a rotatable head carried by said fixed support having a sinuous slot for receiving the pin which is carried by the head on the rod fixed to the movable support, a similar rotatable head associated with the pin on the fixed rod and supported by the movable support, and means for moving the movable support toward the fixed support whereby the advancement of the movable support toward the fixed support will cause the pin to move in the rotatable head on the fixed support and the rotatable head on the movable support to be rotated by the pins on the fixed rod so that both heads will have a turning movement produced thereto.

7. In a severing and cutting mechanism for coiled wires which connect the top and bottom turns of coil springs in pivotal relation to each other, said machine having a support for the rows of springs to be connected together, a support thereabove movable toward the fixed support, a pair of rods one fixed to the fixed support the other fixed to the movable support, a head on each rod carrying a pin, a rotatable head carried by said fixed support having a sinuous slot for receiving the pin which is actuated when relative movement occurs therebetween, a similar head associated with the pin on the fixed rod and supported by the movable head relative to a rotatable head whereby the advancement of the movable support toward the fixed support will cause the pin to move in the rotatable head on the fixed support and the rotatable head on the movable support to be rotated by the pin on the fixed rod so that both heads will have a turning movement produced thereto, each of said supports having a plate containing a cutter into which the end of the coiled wire is advanced after joining the row of turns of the rows of springs, and a severing and twisting tool on the ends of the rotatable heads fixed thereto and rotated therewith, said tools engaging a turn of a coiled wire when advanced into cutting position so that the rotation of the rotatable heads will first cut the end from the coiled wire and twist the endmost turns thereof, thereby locking the coiled wire against endwise disengagement.

References Cited in the file of this patent
UNITED STATES PATENTS

| | | |
|---|---|---|
| 991,542 | Roehrich | May 9, 1911 |
| 1,905,459 | Gail | Apr. 25, 1933 |
| 1,922,002 | Karr | Aug. 8, 1933 |
| 1,930,715 | Heuer | Oct. 17, 1933 |
| 2,161,689 | Strandberg | June 6, 1939 |
| 2,663,038 | Gail | Dec. 22, 1953 |